United States Patent [19]

Comeau et al.

[11] Patent Number: 4,493,155

[45] Date of Patent: Jan. 15, 1985

[54] APPARATUS FOR REMOTELY INDICATING ANGULAR POSITION

[75] Inventors: Joseph H. Comeau, Suffield; Joseph E. Kowles, Wethersfield; John P. Lareau, Granby; Kenneth R. Mayo, Enfield; Herbert A. Runde, Windsor Locks, all of Conn.

[73] Assignee: Combustion Engineering, Inc., Windsor, Conn.

[21] Appl. No.: 427,241

[22] Filed: Sep. 29, 1982

[51] Int. Cl.³ .............................................. G01C 9/10
[52] U.S. Cl. ...................................... 33/366; 33/1 H; 33/312; 33/313
[58] Field of Search ................ 33/304, 312, 313, 365, 33/366, 178 F, 178 R, 1 H, 302, 368, 333, 341, 351, 354; 324/220, 221; 200/61.52

[56] References Cited

U.S. PATENT DOCUMENTS 2,338,811  1/1944  Hasbrook .............................. 33/366
3,460,028  8/1969  Beaver et al. ...................... 33/312 X
4,361,192  11/1982  Trowsdale ........................ 33/302 X

FOREIGN PATENT DOCUMENTS 726809  10/1942  Fed. Rep. of Germany ........ 33/366
740919  11/1932  France ................................. 33/366
2399642  4/1979  France ................................. 33/366

Primary Examiner—Harry N. Haroian
Attorney, Agent, or Firm—Troxell K. Snyder

[57] ABSTRACT

A sensor (16) is affixed to a piece of rotatable equipment (10). The sensor has a rolling member (26) freely moveable within a cage member (18). In operation, the rolling member (26) contacts electrically conductive surfaces (28,30) disposed about the interior of the cage member. By determining which particular pair of surfaces are currently in contact with the rolling member, the orientation of the cage member with respect to the horizontal is known. The preferred embodiment utilizes a resistor network (34) and an electrical measuring device (48) for making this determination.

5 Claims, 3 Drawing Figures

APPARATUS FOR REMOTELY INDICATING ANGULAR POSITION

FIELD OF THE INVENTION

This invention relates to an apparatus for remotely indicating the angular position of a rotatable member, and more particularly to an apparatus for remotely indicating the angular position of a rotatable member by electrical means.

BACKGROUND OF THE INVENTION

It is often advantageous in mechanical operations to have knowledge of the exact angular position of a piece of rotatable equipment. In those operations in which the rotatable member is unaccessable or otherwise hidden from view, some form of remote reading indication must be provided.

One such operation is the testing of the steam generator tubes in a nuclear steam generator. These tubes are installed in the shape of an inverted U and are tested during maintenance service by inserting an eddy current probe into one lower leg of the U and pushing the probe through the length of the steam generator tube. During that portion of the testing scan in which the probe is traversing the horizontal section of the U, an indication of the relative angular position of the probe with respect to the horizontal plane is required. In this way the exact position of a detected defect may be ascertained.

To accomplish this end, the remote position indicating apparatus employed must be small, simple, and employ an electrical means for communicating between the sensor mounted on the test probe and the test equipment operator outside of the steam generator.

SUMMARY OF THE INVENTION

The present invention provides an apparatus for remotely indicating the angular position of rotatable equipment such as an instrument probe used in nuclear steam generator tube inspection. According to the present invention, a hollow cage member is affixed to the instrument probe collinear with the axis of rotation. The inner surface of the cage is supplied with a series of electrically conductive surfaces, the positions of which are known in relation to the orientation of the cage. An electrically conductive rolling member is contained within the cage and is free to move under the influence of gravity.

As the probe, and hence the cage, is rotated, the rolling member will contact the lowermost pair of conductive surfaces thereby establishing electrical communication. By means of any of a variety of sensing devices known in the art, the pair of surfaces currently in electrical communication may be determined, providing an indication of the angular position of the probe with respect to the gravitational vector and therefore the horizontal plane.

DESCRIPTION OF THE PREFERRED EMBODIMENT

Figure 1:
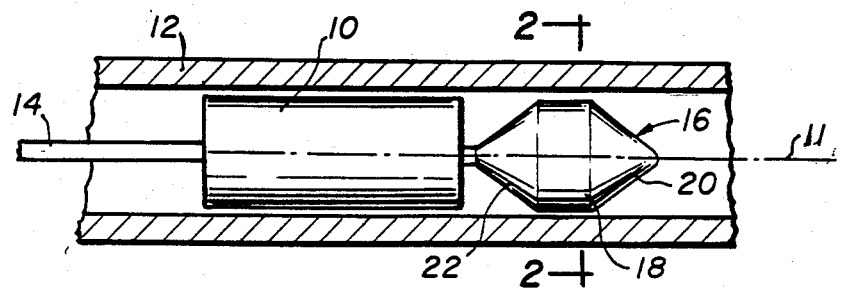
FIG. 1 is a side view of the cage member and test probe in a horizontal section of steam generator tube.

As shown in FIG. 1 the invention is depicted in its preferred embodiment as a sensor 16 composed of three separate parts, a central cylindrical member 18 and two hollow cone end caps 20,22. The cage is affixed to a test probe 20 which is shown in FIG. 1 as being employed to analyze the materials properties of a surrounding tube 12. The probe is translated along the length of the tube 12 by means of a relatively stiff cable 14. As can readily be appreciated, the angular position of the test probe about the central axis of 11 the tube is a necessary piece of information for determining the angular location of any defects which may be detected. In practice this position cannot be ascertained from the physical position of the cable 14 due to the length and torsional flexibility of the cable required to allow the probe to pass through the steam generator tube.

Figure 2:
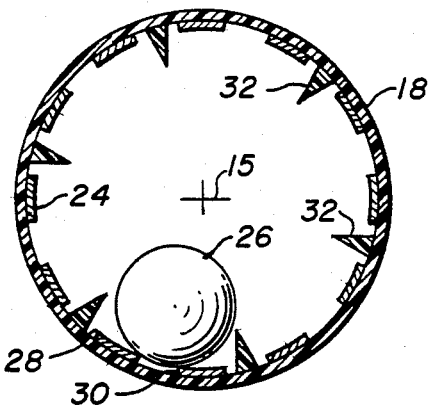
FIG. 2 is a cross-sectional view of the interior of the cage member.

Referring now to FIG. 2 a cross-sectional view of the interior of the cylinder 18 is presented. A series of electrically conductive surfaces 24,28, and 30, etc. are shown disposed around the interior surface of the cylindrical cage 18. A rolling member 26 composed of electrically conductive material is contained within the cage and free to move about under the influence of gravity. When the centerline 15 of the cylindrical cage is in a substantially horizontal orientation, the rolling member 26 will be forced to the bottom of the cage by gravity and contact the electrically conductive surfaces. FIG. 2 shows the rolling member 26 contacting both surfaces 28 and 30. In this way electrical communication is established between surfaces 28 and 30.

The particular pair of electrically conductive surfaces being currently contacted by the rolling member 26 may be determined by means of any of a number of electric devices well known in the art for determining the existance of electrical communication between two ordinarily separate electrical conductors. Based on knowledge of the position of the rolling member within the cage and the orientation of the cage with respect to the probe 10 upon which the cage is fixedly mounted, an indication of the angular position of the probe 10 about the rotational axis 11 with respect to the horizontal may be produced.

Although the cage member in FIG. 2 shows twelve electrically conductive surfaces disposed about the interior of the cage member 18, it can readily be observed that a greater or lesser number of surfaces may be provided depending on the accuracy of position indication desired for a particular application. The surfaces themselves are made of materials resistent to surface oxidation or deterioration and readily conductive of electricity.

In the preferred embodiment, the rolling member 26 is a sphere which allows the rolling member to move freely within the cage and avoids possible interference or misorientation which could occur when a nonspherical rolling member is used in the particular application shown. The surface of the rolling member 26 should also meet the same criteria as that of the conductive surfaces 24,28,30 etc., with regard to resistance to oxidation and electrical conductivity. Gold has been found to be an acceptable and desirable material for this purpose either as plating or in a mixture with a base metal.

The interior of the cage 18 is also shown in FIG. 2 as being provided with a series of insulated standoffs 32 disposed between alternate pairs of adjacent conductive surfaces. These standoffs prevent the rolling member 26 from contacting the pair of adjacent conductive surfaces by physically displacing the rolling member away from the sides of the cage 18. A cage of this configuration would necessarily be supplied with an even number of conductive surfaces about its interior and would permit the rolling member 26 to come in contact with only those pairs of surfaces between which no standoff is positioned. The use of the standoffs in the present invention provides a two-fold advantage in the operation of the position indicator: first, by restricting the number of surfaces to be contacted by the rolling member; and second, by reducing the tendency of the rolling member to become positioned in such a way as to only be in contact with one conductive surface. In the preferred embodiment of the invention, the standoffs 32 as well as the cage member 18 are fabricated from a synthetic resin polymer material.

Figure 3:
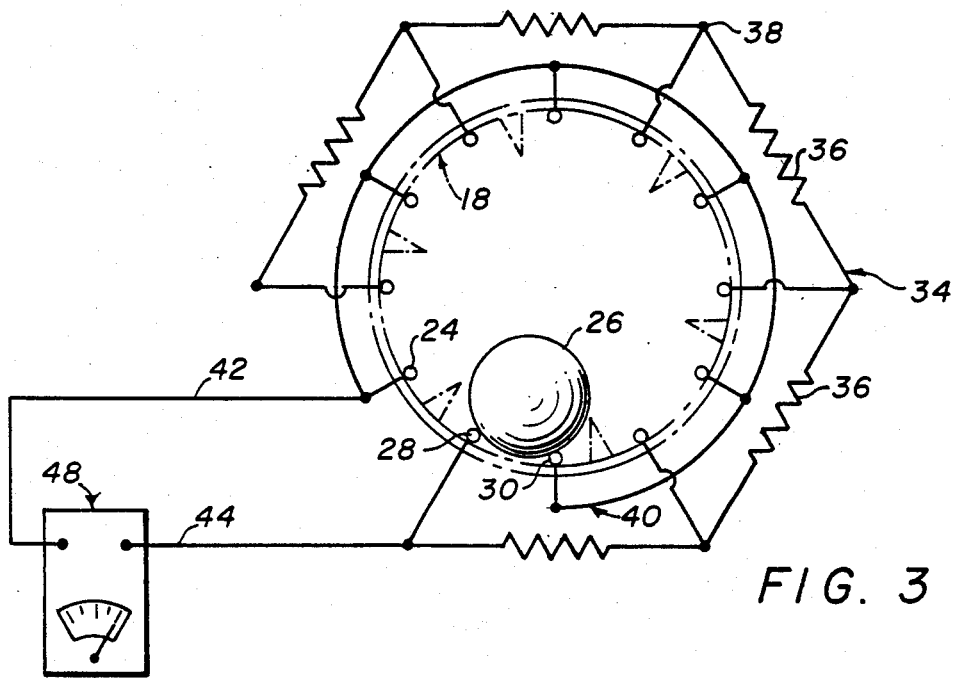
FIG. 3 is an electrical schematic of the indicator circuit.

Shown schematically in FIG. 3 is one means for determining the particular pair of electrically conductive surfaces currently being contacted by the rolling member whereby the angular position of the rotatable test probe is established. The resistance grid 34 is comprised of individual resistors 36 each with a known value of resistance. The resistors are connected in series with each intermediate junction 38 in electrical communication with alternate electrically conductive surfaces disposed on the inner surface of the cage member 18. The common conductor 40 is shown connected to those electrically conductive surfaces not connected to the resistance grid. Wires 42,44 are shown connected respectively to the common conductor and one end of the resistance grid 34. These wires would in practice run from the test probe and cage assembly in the cable 14 to an external operator station.

As shown in FIG. 3 the wires would be connected to an electrical measuring device 48, such as an ohmmeter, for measuring the total resistance present within the electric circuit formed by the resistance grid, the rolling member, and the common conductor. Since the resistors are of known value, the measured total resistance will accurately indicate the particular pair of electrically conductive surfaces currently in contact with the rolling member. The angular position of the cage and test probe with respect to the horizontal is then known.

Alternatively, an ammeter or voltmeter and a source of electromotive force could be used as the detecting device 48 for determining the total grid resistance.

The use of the resistance grid and common conductor requires only two wires between the cage member and the electrical detecting device 48. This does not unnecessarily increase the number of separate wires which must be present in the cable 14. End caps 20,22 shown as hollow conical members in FIG. 1 function to retain the rolling member 26 within the cage 16 when the probe and cage are in an other than substantially horizontal orientation.

As discussed in the preceeding specification and shown in the appended drawings, the present invention thus provides a simple and effective apparatus for remotely indicating the angular position of a test probe or other rotatable equipment with respect to the horizontal. The resistance grid located in the sensor allows the use of only two wires connecting the cage member to the remotely located electrical detecting device for detecting the particular pair of electrically conductive surfaces currently in contact with the rolling member.

We claim:

1. Apparatus for remotely indicating the angular position of a probe about a rotational axis with respect to the horizontal, comprising:
    a cage of substantially cylindrical shape mounted upon said probe and rotatable therewith, the centerline of the cylindrical cage being substantially parallel to said rotational axis;
    a plurality of electrically conductive surfaces disposed upon the inner surface of the cage, each conductive surface being electrically isolated from each other conductive surface and from the cage, the number of surfaces being a multiple of two;
    an electrically conductive rolling member of spherical configuration freely moveable within the cage under the influence of gravity for simultaneously contacting one pair of adjacent conductive surfaces when the cage centerline is in a substantially horizontal orientation, the particular pair of surfaces contacted being dependent upon the relative position of the cage with respect to the gravitational vector;
    a common conductor in electrical communication with alternate conductive surfaces;
    a plurality of resistors of known resistance forming a resistance grid, each individual resistor electrically located between adjacent alternate conductive surfaces not in electrical communication with the common conductor, with the exception of one pair of adjacent alternate conductive surfaces between which no resistor is disposed; and
    an electrical measuring device, forming an electrical circuit in cooperation with the resistance grid, the common conductor, and the rolling member when the rolling member is simultaneously contacting an adjacent pair of conductive surfaces, for determining the total resistance present within the electrical circuit, whereby the particular pair of conductive surfaces in contact with the rolling member may be established and the angular position of said probe indicated.

2. The apparatus for remotely indicating the angular position of a probe of claim 1 further comprising a plurality of standoffs, disposed on the inner surface of the cage between alternating adjacent pairs of conductive surfaces for preventing the rolling member from simultaneously contacting only the pairs of adjacent conductive surfaces with the standoffs disposed therebetween.

3. The apparatus for remotely indicating the angular position of a probe of claims 1 or 2 wherein the electrical measuring device comprises an ohmmeter.

4. The apparatus for remotely indicating the angular position of a probe of claims 4 or 2 wherein the electrical measuring device comprises a voltmeter.

5. The apparatus for remotely indicating the angular position of a probe of claims 1 or 2 wherein the electrical measuring device comprises an ammeter.

* * * * *